US012770971B2

(12) United States Patent
Yang et al.

(10) Patent No.: US 12,770,971 B2
(45) Date of Patent: Oct. 20, 2026

(54) BATTERY PACK, ENERGY STORAGE SYSTEM, AND VEHICLE

(71) Applicant: LG ENERGY SOLUTION, LTD., Seoul (KR)

(72) Inventors: Chang-Hyeon Yang, Daejeon (KR); Hae-Jin Kim, Daejeon (KR); Hyong-Seok Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 624 days.

(21) Appl. No.: 18/018,682

(22) PCT Filed: Jan. 6, 2022

(86) PCT No.: PCT/KR2022/000254
§ 371 (c)(1),
(2) Date: Jan. 30, 2023

(87) PCT Pub. No.: WO2022/149889
PCT Pub. Date: Jul. 14, 2022

(65) Prior Publication Data

US 2023/0307782 A1 Sep. 28, 2023

(30) Foreign Application Priority Data

Jan. 8, 2021 (KR) ........................ 10-2021-0002898

(51) Int. Cl.
*H01M 10/00* (2006.01)
*H01M 50/211* (2021.01)
(Continued)

(52) U.S. Cl.
CPC ....... *H01M 50/383* (2021.01); *H01M 50/211* (2021.01); *H01M 50/262* (2021.01); *H01M 50/271* (2021.01)

(58) Field of Classification Search
CPC ............. H01M 50/383; H01M 50/211; H01M 50/262; H01M 50/271
See application file for complete search history.

(56) References Cited

U.S. PATENT DOCUMENTS

2009/0236162 A1 9/2009 Takasaki et al.
2011/0143193 A1* 6/2011 Ahn .................... H01M 50/103 429/176
(Continued)

FOREIGN PATENT DOCUMENTS

CN 109411640 A 3/2019
CN 110459703 A 11/2019
(Continued)

OTHER PUBLICATIONS

International Search Report for PCT/KR2022/000254 (PCT/ISA/210) mailed on Apr. 21, 2022.
(Continued)

*Primary Examiner* — Nicholas P D'Aniello
(74) *Attorney, Agent, or Firm* — Birch, Stewart, Kolasch & Birch, LLP

(57) ABSTRACT

A battery pack includes a battery module including a plurality of battery cells; a pack housing configured to accommodate the battery module therein, and including a first case configured to cover one side of the battery module and having an open other side, and a second case configured such that it covers the other side of the battery module, one side thereof is open, and one side end thereof is coupled to the other side end of the first case; and a sealing member configured to be melted at a predetermined temperature or higher to flow into a gap between one end of the first case and the other end of the second case.

11 Claims, 8 Drawing Sheets

(51) Int. Cl.
*H01M 50/262* (2021.01)
*H01M 50/271* (2021.01)
*H01M 50/383* (2021.01)

(56) References Cited

U.S. PATENT DOCUMENTS

| | | | | |
|---|---|---|---|---|
| 2012/0164500 | A1* | 6/2012 | Loo | B60L 50/64 429/82 |
| 2012/0308858 | A1* | 12/2012 | Hermann | H01M 50/367 429/82 |
| 2013/0252058 | A1 | 9/2013 | Kim | |
| 2021/0320374 | A1 | 10/2021 | Lee et al. | |

FOREIGN PATENT DOCUMENTS

| | | | |
|---|---|---|---|
| CN | 110718655 | A | 1/2020 |
| CN | 111755633 | A | 10/2020 |
| DE | 10 2017 205 439 | A1 | 7/2017 |
| JP | 2009-181830 | A | 8/2009 |
| JP | 2012-209174 | A | 10/2012 |
| JP | 2014-134098 | A | 7/2014 |
| JP | 2015-153616 | A | 8/2015 |
| JP | 2016-72041 | A | 5/2016 |
| JP | 2019-106307 | A | 6/2019 |
| KR | 10-2013-0107790 | A | 10/2013 |
| KR | 10-2017-0134114 | A | 12/2017 |
| KR | 10-2018-0013345 | A | 2/2018 |
| KR | 10-2018-0038291 | A | 4/2018 |
| KR | 10-2143111 | B1 | 8/2020 |
| KR | 10-2020-0105315 | A | 9/2020 |
| KR | 10-2020-0107213 | A | 9/2020 |
| KR | 10-2020-0111352 | A | 9/2020 |
| WO | WO 2020/196267 | A1 | 10/2020 |

OTHER PUBLICATIONS

Extended European Search Report for European Application No. 22736866.9, dated Jul. 1, 2024.

* cited by examiner

BATTERY PACK, ENERGY STORAGE SYSTEM, AND VEHICLE

TECHNICAL FIELD

The present disclosure relates to a battery pack, an energy storage system, and a vehicle, and more specifically, to a battery pack with improved safety against fire or explosion.

The present application claims priority to Korean Patent Application No. 10-2021-0002898 filed on Jan. 8, 2021 in the Republic of Korea, the disclosures of which are incorporated herein by reference.

BACKGROUND ART

As the demand for portable electronic products such as laptops, video cameras, and mobile phones has rapidly increased in recent years and the development of electric vehicles, energy storage batteries, robots, and satellites has begun in earnest, research on high-performance secondary batteries capable of repeated charge/discharge has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus have advantages of free charge/discharge, very low self-discharge rate, and high energy density.

A lithium secondary battery mainly uses a lithium-based oxide and a carbon material as a positive electrode active material and a negative electrode active material, respectively. In addition, the lithium secondary battery includes an electrode assembly in which a positive electrode plate and a negative electrode plate coated with the positive electrode active material and the negative electrode active material, respectively are disposed with a separator interposed therebetween, and a casing, that is, a battery case, for sealing and accommodating the electrode assembly along with an electrolyte.

In addition, depending on the shape of a casing, lithium secondary batteries may be classified into a can-type secondary battery in which an electrode assembly is embedded in a metal can, and a pouch-type secondary battery in which an electrode assembly is embedded in a pouch of an aluminum laminate sheet.

In particular, the demand for large-capacity battery packs applied to electric vehicles and the like has recently increased. Such a large-capacity battery module has a plurality of secondary batteries, and thus, when a fire or explosion occurs in the plurality of second batteries, flame and high-temperature gas are ejected, thereby causing damage such as the spread of fire to other battery packs in the vehicle, damage to other adjacent devices, or injury to occupants. Accordingly, there is a need for a method to improve the safety against fire or gas explosion of the battery pack.

DISCLOSURE

Technical Problem

The present disclosure is designed to solve the problems of the related art, and therefore the present disclosure is directed to providing a battery pack with improved safety against fire or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack including:

a battery module including a plurality of battery cells;

a pack housing configured to accommodate the battery module therein, and including a first case configured to cover a first side of the battery module and having an open side, and a second case configured to cover a second side of the battery module, and having an open side, the second case coupled to the first case at a joint; and a sealing member configured to be melted at a predetermined temperature or higher to flow into a gap between the first case and the second case.

In addition, the battery pack may further include a mounting member configured to retain the sealing member and having at least one open side so that the sealing member is discharged to the outside.

Further, the mounting member may have a guide groove to guide a discharge direction of the sealing member.

Moreover, the battery pack may further include a guide member configured to receive the molten member and form a moving path through which the sealing member moves.

In addition, the guide member may have an inclined surface extending downwardly in a direction toward the joint.

Moreover, a guide rib may be formed on the guide member to guide the sealing member to move in a direction toward the joint.

In addition, the first case includes a first accommodation portion accommodating the first side of the battery module, and a first flange portion extending horizontally from the first accommodation portion, the second case includes a second accommodation portion accommodating the second side of the battery module, and a second flange portion extending horizontally from the second accommodation portion and positioned to face the first flange portion, and the sealing member is configured to flow between the first flange portion and the second flange portion.

In addition, the pack housing includes a gasket configured to be interposed between the first flange portion and the second flange portion, and a plurality of coupling members configured to couple the first flange portion and the second flange portion and spaced apart from each other by a predetermined distance, and the sealing member may be positioned between the plurality of coupling members.

Moreover, the sealing member may be interposed between the first flange portion and the second flange portion.

In another aspect of the present disclosure, there is also provided an energy storage system including at least one battery pack.

In another aspect of the present disclosure, there is also provided a vehicle including at least one battery pack.

A mounting member may be on an inner surface of the first case, the mounting member retaining the sealing member and a guide member may be on an inner surface of the second case and under the mounting member, the guide member guiding the sealing member into the joint.

Advantageous Effects

According to an embodiment of the present disclosure, since the present disclosure includes a sealing member, it is possible to prevent high-temperature gas or flame from being discharged through a gap between one end of the first case and the other end of the second case when an internal battery module is ignited or exploded. That is, when the internal temperature of the pack housing increases over a predetermined temperature due to a fire, the sealing member may be melted and moved to cover the gap between one end of the first case and the other end of the second case. Accordingly, in the present disclosure, it is possible to prevent the flame ejected from the battery module from being discharged to the outside through the gap between one end of the first case and the other end of the second case. As a result, the battery pack of the present disclosure can improve safety against high-temperature gas or flame generated by an explosion or fire.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
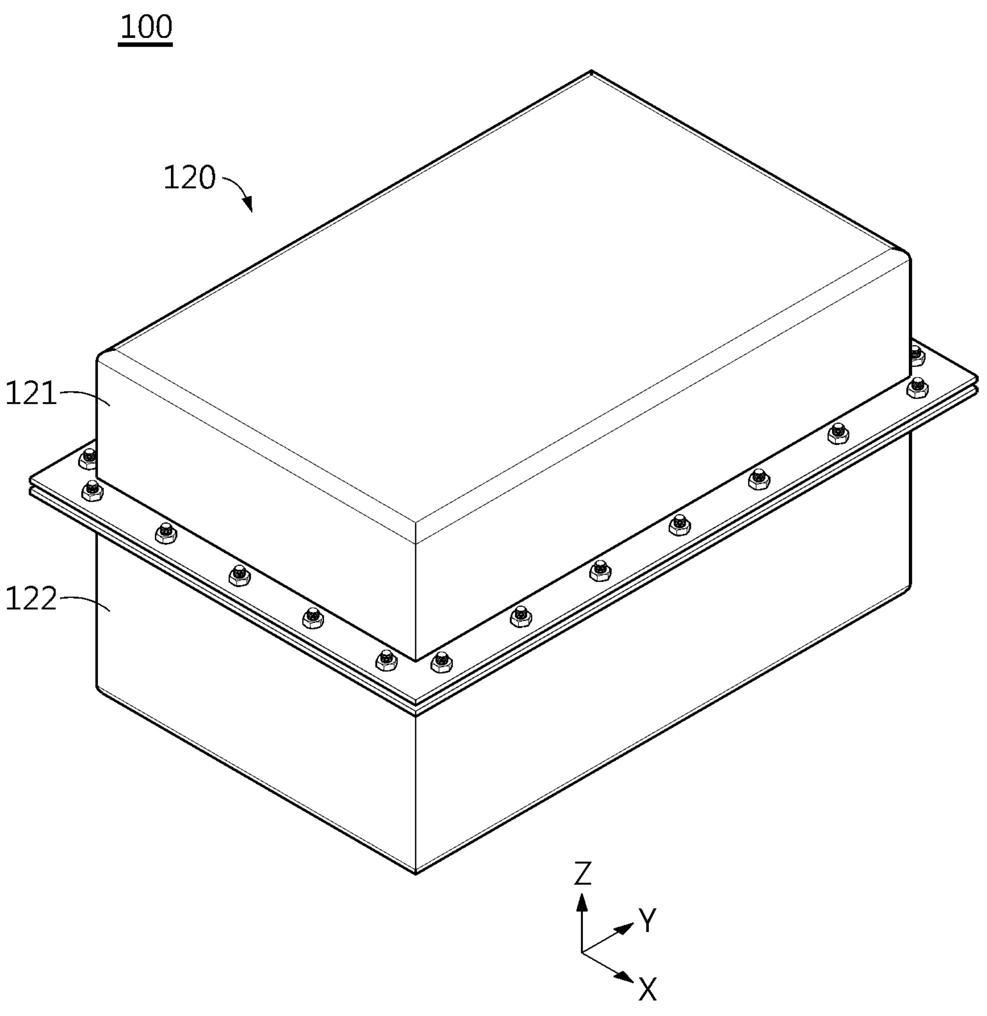
FIG. 1 is a perspective view schematically showing a battery pack according to an embodiment of the present disclosure.
Figure 2:
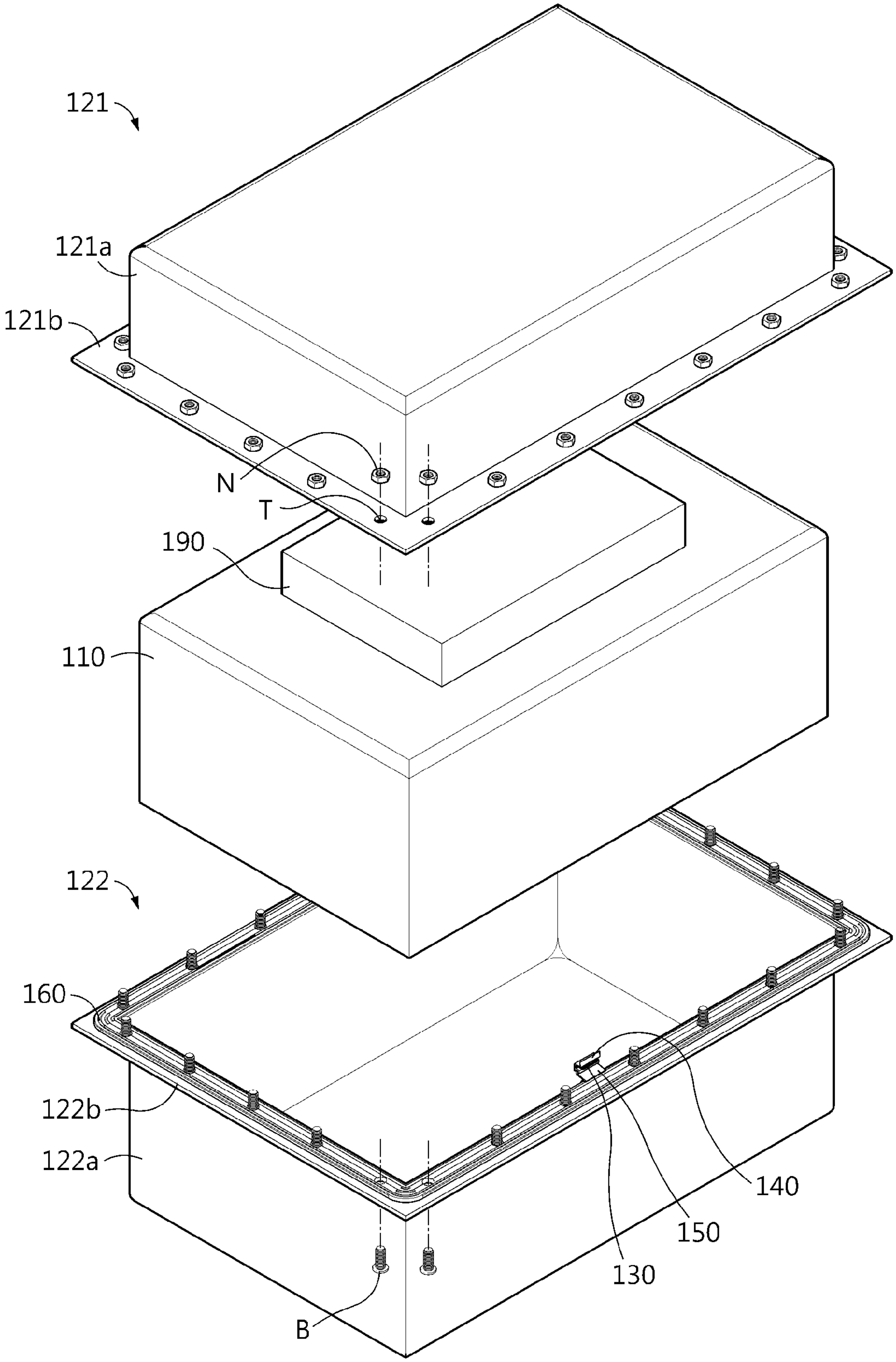
FIG. 2 is an exploded perspective view schematically showing configurations of a battery pack according to an embodiment of the present disclosure.
Figure 3:
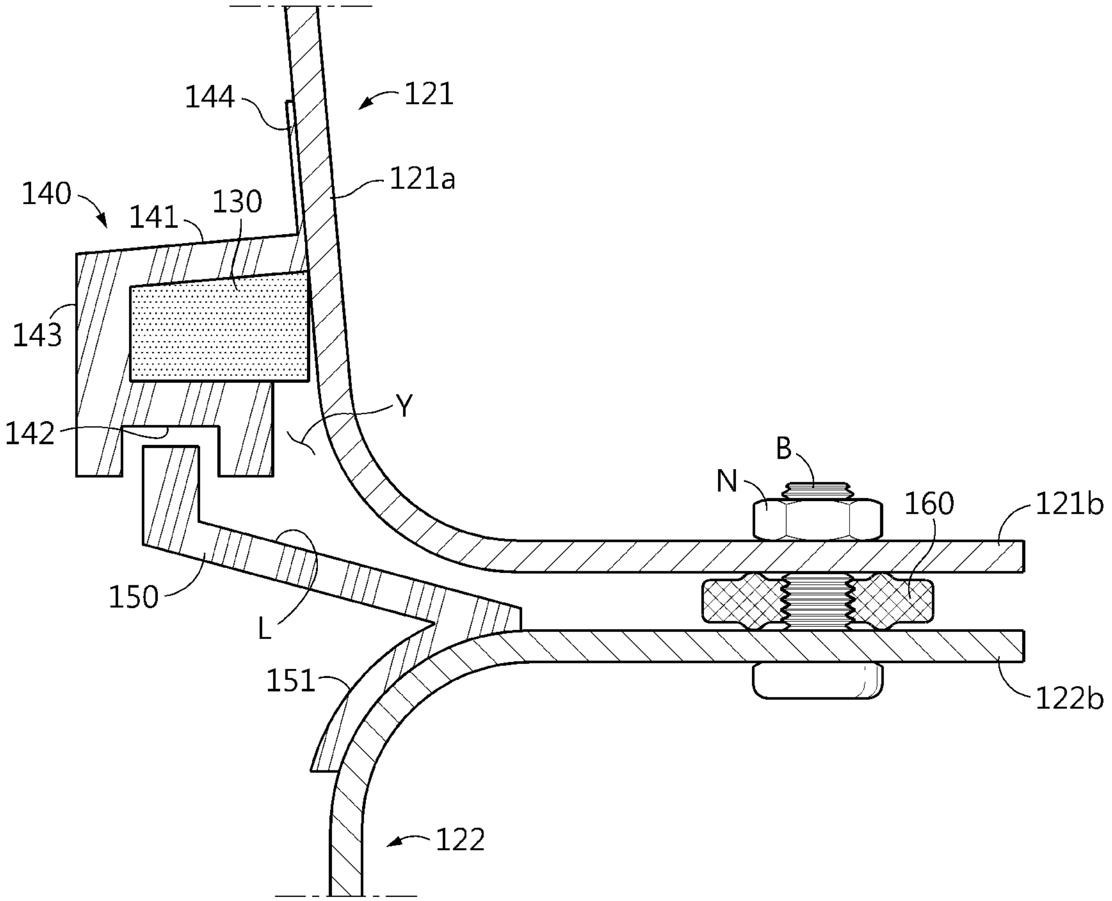
FIGS. 3 and 4 are partial vertical cross-sectional views schematically showing a portion of a battery pack according to an embodiment of the present disclosure.
Figure 4:
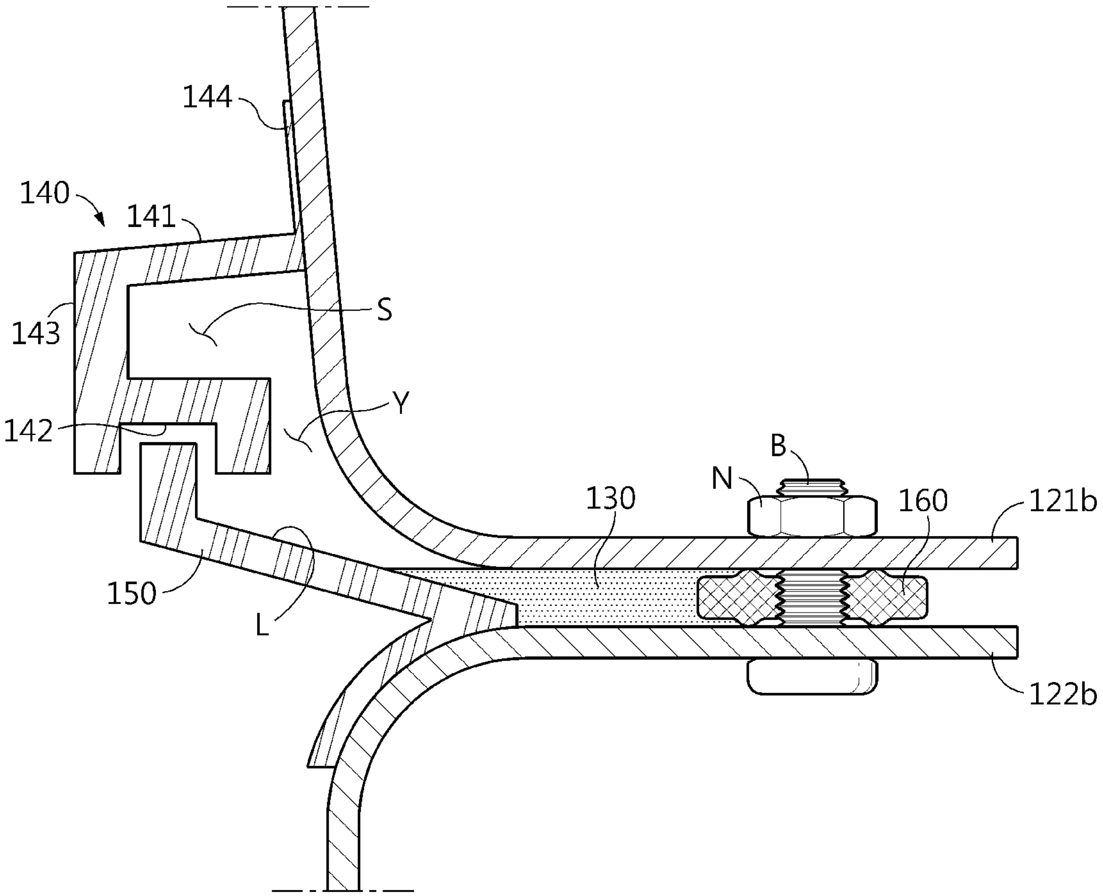

FIG. 1 is a perspective view schematically showing a battery pack according to an embodiment of the present disclosure. FIG. 2 is an exploded perspective view schematically showing configurations of a battery pack according to an embodiment of the present disclosure. Also, FIGS. 3 and 4 are partial vertical cross-sectional views schematically showing a portion of a battery pack according to an embodiment of the present disclosure. For reference, each of the arrows of the X-axis, Y-axis, and Z-axis shown in FIG. 1 may indicate a left direction, a rear direction, and an upward direction with respect to the battery pack.

Referring to FIGS. 1 to 4, a battery pack 100 according to an embodiment of the present disclosure may include a battery module 110, a pack housing 120, and a sealing member 130.

Specifically, the battery module 110 may include a plurality of battery cells (not shown). The battery cell may be a pouch-type battery cell having an electrode assembly (not shown), an electrolyte (not shown), and a pouch accommodating them therein. The battery cell may include a positive electrode terminal and a negative electrode terminal. However, the battery pack 100 according to the present disclosure is not limited to the above-described pouch-type battery cells, and various types of battery cells known at the time of filing of this application may be employed.

In addition, the battery module 110 may include at least one bus bar (not shown) configured to electrically interconnect the plurality of battery cells. Specifically, the bus bar may include a conductive metal. The conductive metal may include, for example, copper, aluminum, nickel, or the like.

Moreover, the battery module 110 may include a module case configured to accommodate the plurality of battery cells therein. The module case may have a rectangular box shape of a rectangular parallelepiped. The module case may include an electrically insulating material. The electrically insulating material may be, for example, polyvinyl chloride.

Also, the battery module 110 may include external terminals (not shown). The external terminals may be an external positive electrode terminal and an external negative electrode terminal depending on the electrical polarity. Each of the external positive electrode terminal and the external negative electrode terminal may be electrically connected to a BMS module 190. The BMS module 190 may be configured to control charge/discharge of the battery module 110.

Further, the pack housing 120 may have an accommodation space in order to accommodate the battery module 110 therein. The pack housing 120 may include a first case 121 and a second case 122. The first case 121 may be configured to cover one side of the battery module 110. For example, the first case 121 may have an upper wall to cover an upper portion of the battery module 110, and a front wall, a left wall, a rear wall, and a right wall to cover each of a front side, a left side, a rear side, and a right side of the battery module 110. The first case 121 may be configured such that the other side (lower portion) opposite to the one side is open. That is, the battery module 110 may be inserted through the open structure of the lower portion of the first case 121, so that the upper portion of the battery module 110 may be accommodated in the accommodation space of the first case 121.

In addition, the second case 122 may be configured to cover the other side of the battery module 110. For example, the second case 122 may include a lower wall to cover a lower portion of the battery module 110, and a front wall, a left wall, a rear wall, and a right wall to cover each of a front side, a left side, a rear side, and a right side of the battery module 110. The second case 122 may be configured such that one side (upper portion) opposite to the other side is open. That is, the battery module 110 may be inserted through the open structure of the upper portion of the second case 122, so that the lower portion of the battery module 110 may be accommodated in the accommodation space of the second case 122. One end of the second case 122 may be coupled to the other end of the first case 121. For example, as shown in FIG. 1, an upper end of the second case 122 may be coupled to a lower end of the first case 121. In this case, a coupling method may be bonding, welding, bolt (B) coupling, or the like.

Moreover, the sealing member 130 may be configured such that at least a portion thereof is melted at a predetermined temperature or higher. For example, the predetermined temperature may be, for example, 327 degrees Celsius or higher, and preferably, the predetermined temperature may be 400 degrees Celsius to 600 degrees Celsius. More preferably, the predetermined temperature may be 550 degrees Celsius to 600 degrees Celsius. The sealing member 130 may include at least one of lead (Pb) having a melting point of about 327 degrees Celsius, zinc (Zn) having a melting point of about 420 degrees Celsius, and tellurium having a melting point of about 450 degrees Celsius. That is, when the internal temperature of the pack housing 120 reaches at least 600 degrees Celsius or higher, the sealing member 130 may include a material that can melt all portions. However, the sealing member 130 is not necessarily limited to these examples, and for example, any metal that can be melted in whole at 600 degrees Celsius may be applied.

The sealing member 130 may be configured to be melted at a predetermined temperature or higher to flow into a gap between one end of the first case 121 and the other end of the second case 122. That is, the sealing member 130 may be configured to tightly seal a coupling portion between one end of the first case 121 and the other end of the second case 122. In other words, when melted at the predetermined temperature, the sealing member 130 may be configured such that the sealing member 130 in its liquid state flows into a gap between one end of the first case 121 and the other end of the second case 122 to fill the gap between one end of the first case 121 and the other end of the second case 122.

Therefore, according to this configuration of the present disclosure, since the present disclosure includes the sealing member 130, it is possible to prevent high-temperature gas or flame from being discharged through the gap between one end of the first case 121 and the other end of the second case 122, when the internal battery module 110 is ignited or exploded. That is, when the internal temperature of the pack housing 120 increases over, for example, 600 degrees Celsius due to a fire, the sealing member 130 may be melted and moved to cover the gap between one end of the first case 121 and the other end of the second case 122. Accordingly, in the present disclosure, it is possible to prevent the flame ejected from the battery module 110 from being discharged to the outside through the gap between one end of the first case 121 and the other end of the second case 122.

Meanwhile, referring to FIGS. 1 to 3 again, the first case 121 may include a first accommodation portion 121*a* and a first flange portion 121*b*. The first accommodation portion 121*a* may accommodate one side of the battery module 110. The first accommodation portion 121*a* may have a shape in which the other side thereof is open. For example, as shown in FIG. 2, the first accommodation portion 121*a* may be configured to accommodate an upper portion of the battery module 110. The first accommodation portion 121*a* may have a shape in which a lower portion thereof is open.

In addition, the first flange portion 121*b* may be a portion of the first case 121 extending in a horizontally bent form from the other end of the first accommodation portion 121*a*. The first flange portion 121*b* may be a portion bent and extended in a horizontal direction from a lower end of the first accommodation portion 121*a*.

Moreover, the second case 122 may include a second accommodation portion 122*a* and a second flange portion 122*b*. The second accommodation portion 122*a* may accommodate the other side of the battery module 110. The second accommodation portion 122*a* may have a shape in which one side thereof is open. For example, as shown in FIG. 2, the second accommodation portion 122*a* may be configured to accommodate a lower portion of the battery module 110. The second accommodation portion 122*a* may have a shape in which an upper portion thereof is open.

In addition, the second flange portion 122*b* may be a portion of the second case 122 extending in a horizontally bent form from one end of the second accommodation portion 122*a*. The second flange portion 122*b* may be a portion bent and extended in a horizontal direction from an upper end of the second accommodation portion 122*a*. The second flange portion 122*b* may be positioned to face a lower surface of the first flange portion 121*b*.

Moreover, the pack housing 120 may further include a gasket 160. The gasket 160 may be configured to be interposed between the first flange portion 121*b* and the second flange portion 122*b*. A plurality of protrusions configured to support a lower surface of the first flange portion 121*b* in an upward direction may be formed at an upper portion of the gasket 160. A plurality of protrusions configured to support an upper surface of the second flange portion 122*b* in a downward direction may be formed at a lower portion of the gasket 160.

In addition, the gap between one end of the first case 121 and the other end of the second case 122, as described above may be a gap between the first flange portion 121*b* and the second flange portion 122*b*. Alternatively, the gap may be formed between the lower surface of the first flange portion 121*b* and the upper surface of the gasket 160. Alternatively, the gap may be formed between the upper surface of the second flange portion 122*b* and the lower surface of the gasket 160. That is, when the battery module 110 inside the pack housing 120 is ignited, deformation such as shrinkage or distortion of the gasket 160 occurs due to high-temperature gas and flame, and thus a gap may be formed between the gasket 160 and the first flange portion 121*b* or between the gasket 160 and the second flange portion 122*b*.

In addition, the first flange portion 121*b* and the second flange portion 122*b* may be coupled to each other. A plurality of coupling members configured to couple the first flange portion 121*b* and the second flange portion 122*b* and spaced apart from each other by a predetermined distance may be provided. The coupling member may include a bolt B and a nut N. For example, a plurality of bolt holes T configured such that the bolt B is inserted, may be formed in each of the first flange portion 121*b* and the second flange portion 122*b*. That is, while the first flange portion 121*b* and the second flange portion 122*b* are positioned to face each other, the bolt B is inserted into the bolt hole T formed in each of the first flange portion 121*b* and the second flange portion 122*b*, and the bolt B may be fastened using the nut N so that the bolt B does not come out again from the bolt hole T.

Further, the sealing member 130 may be positioned between the plurality of coupling members. That is, a central position between the plurality of coupling members may be a portion where the coupling member has the least fastening force for pressing each of the first flange portion 121*b* and the second flange portion 122*b*. For this reason, the central position between the plurality of coupling members of the pack housing 120 may be a portion where flame is highly likely to be discharged in case of a fire or explosion of the battery module 110.

Accordingly, since the sealing member 130 is located between the plurality of coupling members in the present disclosure, it is possible to seal a portion where flame is highly likely to be discharged in case of a fire or explosion of the battery module 110, thereby effectively preventing the flame from being discharged to the outside of the pack housing 120.

However, the sealing member 130 is not limited to being positioned only between the plurality of coupling members, and may be positioned at any portion of the pack housing 120 where a gap in circulation with the outside can occur. For example, four sealing members 130 may be positioned at each of the four corner portions of the pack housing 120. Alternatively, a plurality of sealing members 130 may be positioned along the first flange portion 121*b* and the second flange portion 122*b*.

Referring to FIGS. 3 and 4 again, the molten sealing member 130 may be configured to flow between the first flange portion 121*b* and the second flange portion 122*b*. For example, the sealing member 130 in FIG. 3 is in a state of not being melted. However, when the inside of the pack housing 120 is in a high temperature state above a predetermined temperature in the event of a fire of the battery module 110, the sealing member 130 may be melted to flow between the first flange portion 121*b* and the second flange portion 122*b*. At this time, the sealing member 130 introduced into the space between the first flange portion 121*b* and the second flange portion 122*b* may be hardened again due to a decrease in temperature. That is, in the event of a fire of the battery module 110, a temperature of the space between the first flange portion 121*b* and the second flange portion 122*b*, which is located relatively outside the center of the pack housing 120 so that the influence of the outside air is large and the influence of the internal temperature increased due to the ignition is small, may be relatively low compared to the internal center of the pack housing 120.

Therefore, according to this configuration of the present disclosure, since the present disclosure is configured such that the sealing member 130 is melted at a predetermined temperature or higher and then introduced between the first flange portion 121*b* and the second flange portion 122*b*, it is possible to prevent high-temperature gas or flame from being discharged through the gap between one end of the first case 121 and the other end of the second case 122, when the internal battery module 110 is ignited or exploded. That is, when the internal temperature of the pack housing 120 increases at, for example, 600 degrees Celsius or higher due to a fire, the sealing member 130 is melted and moved to cover the gap between one end of the first case 121 and the other end of the second case 122, and then hardened again to seal the gap more stably.

Figure 5:
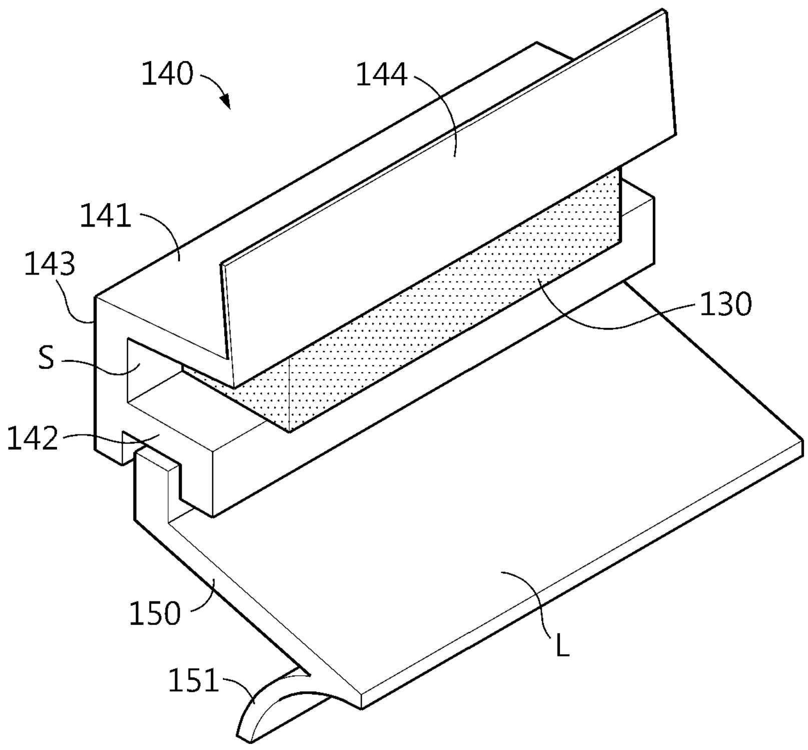
FIG. 5 is a perspective view schematically showing a sealing member, a mounting member, and a guide member of a battery pack according to an embodiment of the present disclosure.

FIG. 5 is a perspective view schematically showing a sealing member, a mounting member, and a guide member of a battery pack according to an embodiment of the present disclosure.

Meanwhile, referring to FIG. 5 along with FIGS. 2 to 4 again, the battery pack 100 according to an embodiment of the present disclosure may further include a mounting member 140. The mounting member 140 may be configured to mount the sealing member 130. For example, the mounting member 140 includes an upper portion 141, a lower portion 142, and a connection portion 143 that connects each of the ends of the upper portion 141 and the lower portion 142 and extends in a vertical direction. As shown in FIG. 5, a separated space S may be formed between the upper portion 141 and the lower portion 142. The sealing member 130 may be accommodated in the separated space S. The mounting member 140 may have a shape in which at least one side thereof is open so that the molten sealing member 130 is discharged to the outside.

For example, the mounting member 140 may have a shape opened toward the sidewall of the first case 121. In addition, the mounting member 140 may be partially spaced apart from the sidewall of the first case 121 to form a discharge space Y. In the mounting member 140, the molten sealing member 130 may be moved downward through the discharge space Y. The mounting member 140 may include a coupling portion 144 configured to be partially coupled to an inner surface of the first accommodation portion 121*a* of the first case 121. The coupling portion 144 may be welded or bonded to the inner surface of the first accommodation portion 121*a*.

Therefore, according to this configuration of the present disclosure, the present disclosure includes the mounting member 140, so that the sealing member 130 can be stably accommodated, and thus, when the sealing member 130 is melted, the movement of the molten sealing member may be guided in a direction between one end of the first case 121 and the other end of the second case 122 through the discharge space.

In addition, the battery pack 100 according to an embodiment of the present disclosure may further include a guide member 150. The guide member 150 may be configured to receive the molten sealing member 130. The guide member 150 may be configured to form a moving path through which the received sealing member 130 moves. For example, the guide member 150 may have an inclined surface L extending downwardly in a direction between one end of the first case 121 and the other end of the second case 122. For example, the guide member 150 may have an inclined surface L downward at an angle of 25 degrees.

Moreover, the guide member 150 may be positioned below the mounting member 140. The guide member 150 may be configured to receive the molten sealing member 130 passing through the discharge space between the mounting member 140 and the first accommodation portion 121*a*. That is, the inclined surface L of the guide member 150 may be positioned below the discharge space Y.

Also, the guide member 150 may include a fixing portion 151. The fixing portion 151 may be configured to be fixed to the inner surface of the second case 122. For example, the fixing portion 151 may be welded or bonded to the inner surface of the second case 122.

Therefore, according to this configuration of the present disclosure, since the present disclosure includes the guide member 150, it is possible to stably receive the molten sealing member 130 discharged from the mounting member 140, and then guide the sealing member 130 to move in a direction between one end of the first case 121 and the other end of the second case 122. Accordingly, in the present disclosure, it is possible to prevent a malfunction in which the molten sealing member 130 is lost without being able to move in a direction between one end of the first case 121 and the other end of the second case 122, and thus the gap between one end of the first case 121 and the other end of the second case 122 may not be sealed.

Moreover, the guide member 150 may be configured to prevent flame from being introduced between one end of the first case 121 and the other end of the second case 122. For example, a portion of the guide member 150 on which the inclined surface L is formed may be positioned between the first flange portion 121*b* and the second flange portion 122*b*. That is, the guide member 150 may screen the flame so that the flame is not directly transmitted to the gasket 160. Also, when the mounting member 140 is positioned between one end of the first case 121 and the other end of the second case 122, it is possible to screen the flame so that the flame is not directly transmitted to the gasket 160.

Therefore, according to this configuration of the present disclosure, since the present disclosure includes the guide member 150 positioned between the first flange portion 121*b* and the second flange portion 122*b*, it is possible to effectively prevent the flame from being introduced between one end of the first case 121 and the other end of the second case 122.

Figure 6:
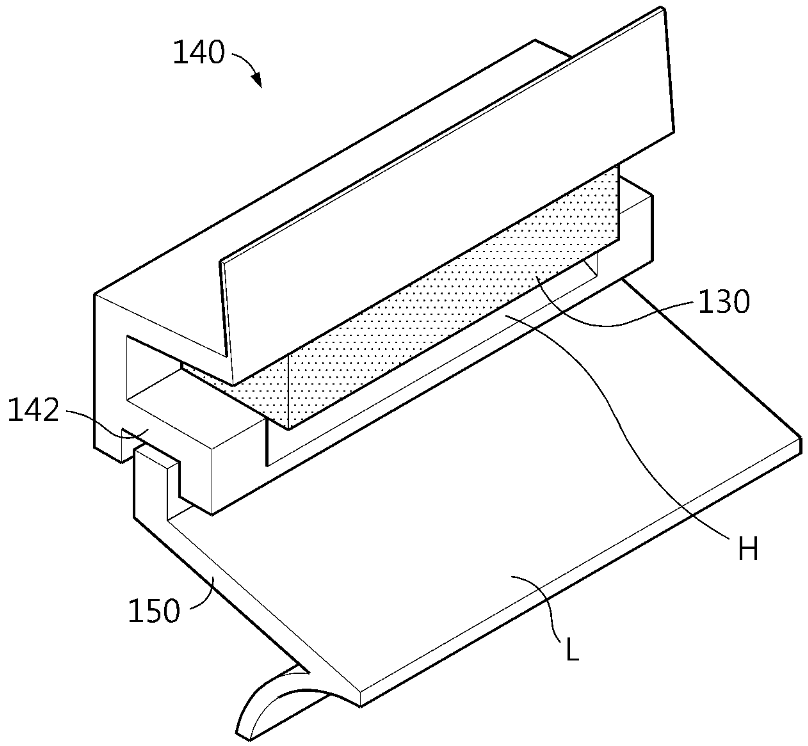
FIG. 6 is a perspective view schematically showing a sealing member, a mounting member, and a guide member of a battery pack according to another embodiment of the present disclosure.

FIG. 6 is a perspective view schematically showing a sealing member, a mounting member, and a guide member of a battery pack according to another embodiment of the present disclosure.

Referring to FIG. 6 along with FIGS. 3 and 4 again, the mounting member 140 of the battery pack 100 according to another embodiment of the present disclosure may further include a guide groove H when compared with the mounting member 140 in FIG. 5. The other remaining configurations are the same as those of the battery pack 100 in FIG. 5.

Specifically, a guide groove H extending to guide a discharge direction of the molten sealing member 130 may be formed in the mounting member 140 in FIG. 6. The guide groove H may be formed such that the upper surface of the lower part 142 of the mounting member 140 is cut in a downward direction. The guide groove H may be formed such that the upper surface of the lower portion 142 of the mounting member 140 is grooved in a downward direction. The inner bottom surface of the guide groove H may have a downwardly inclined shape. The guide groove H may be configured such that the molten sealing member 130 may be stably accommodated on the inclined surface L of the guide member 150. That is, the guide groove H may guide the molten sealing member 130 to flow down to the inclined surface L of the guide member 150.

Therefore, according to this configuration of the present disclosure, since the present disclosure includes the mounting member 140 having the guide groove H, it is possible to guide the guide member 150 to stably receive the molten sealing member 130. Accordingly, in the present disclosure, it is possible to prevent a malfunction in which the molten sealing member 130 is lost without being able to move in a direction between the first flange portion 121*b* and the second flange portion 122*b*, and thus the gap between the first flange portion 121*b* and the second flange portion 122*b* may not be sealed.

Figure 7:
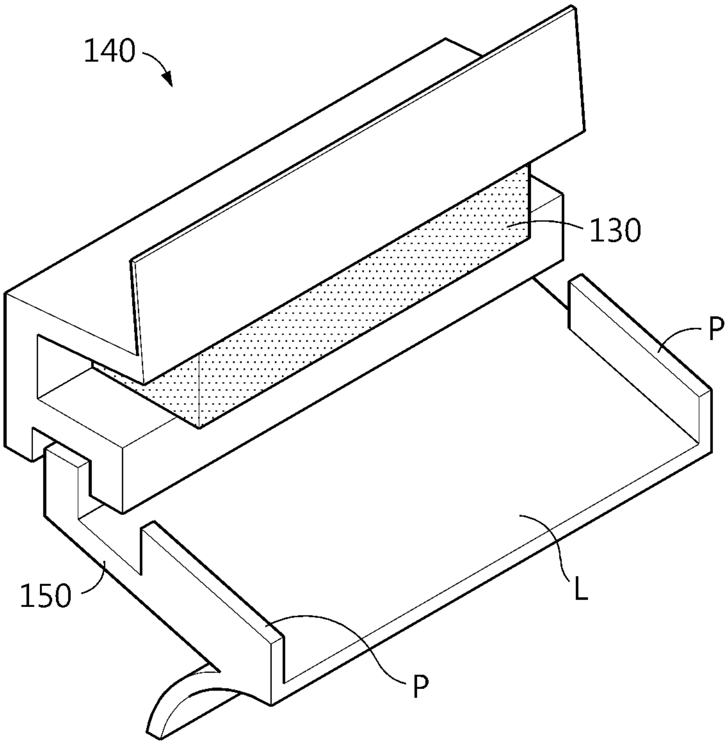
FIG. 7 is a perspective view schematically showing a sealing member, a mounting member, and a guide member of a battery pack according to still another embodiment of the present disclosure.

FIG. 7 is a perspective view schematically showing a sealing member, a mounting member, and a guide member of a battery pack according to still another embodiment of the present disclosure.

Referring to FIG. 7 along with FIGS. 3 and 4 again, the guide member 150 of the battery pack 100 according to still another embodiment of the present disclosure may further include a guide rib P when compared with the guide member 150 in FIG. 5. The other remaining configurations are the same as those of the battery pack 100 in FIG. 5.

Specifically, the guide member 150 in FIG. 7 may include a guide rib P extending to guide a discharge direction of the molten sealing member 130. The guide rib P may be configured to allow the molten sealing member 130 to move in a direction between one end of the first case 121 and the other end of the second case 122 from the receiving portion of the sealing member 130. That is, the guide rib P may be formed at one or both ends of the inclined surface L in order to prevent the molten sealing member 130 from escaping to one side or both sides different from the direction without moving between the first flange portion 121*b* and the second flange portion 122*b*. Accordingly, the guide rib P may be configured such that the molten sealing member 130 may be stably moved without being separated from the inclined surface L of the guide member 150.

Therefore, according to this configuration of the present disclosure, since the present disclosure includes the guide member 150 having the guide rib P, it is possible to guide the molten sealing member 130 to stably move along the inclined surface L of the guide member 150. Ultimately, in the present disclosure, it is possible to prevent a malfunction in which the molten sealing member 130 is lost without being able to move in a direction between the first flange portion 121*b* and the second flange portion 122*b*, and thus the gap between the first flange portion 121*b* and the second flange portion 122*b* may not be sealed.

Figure 8:
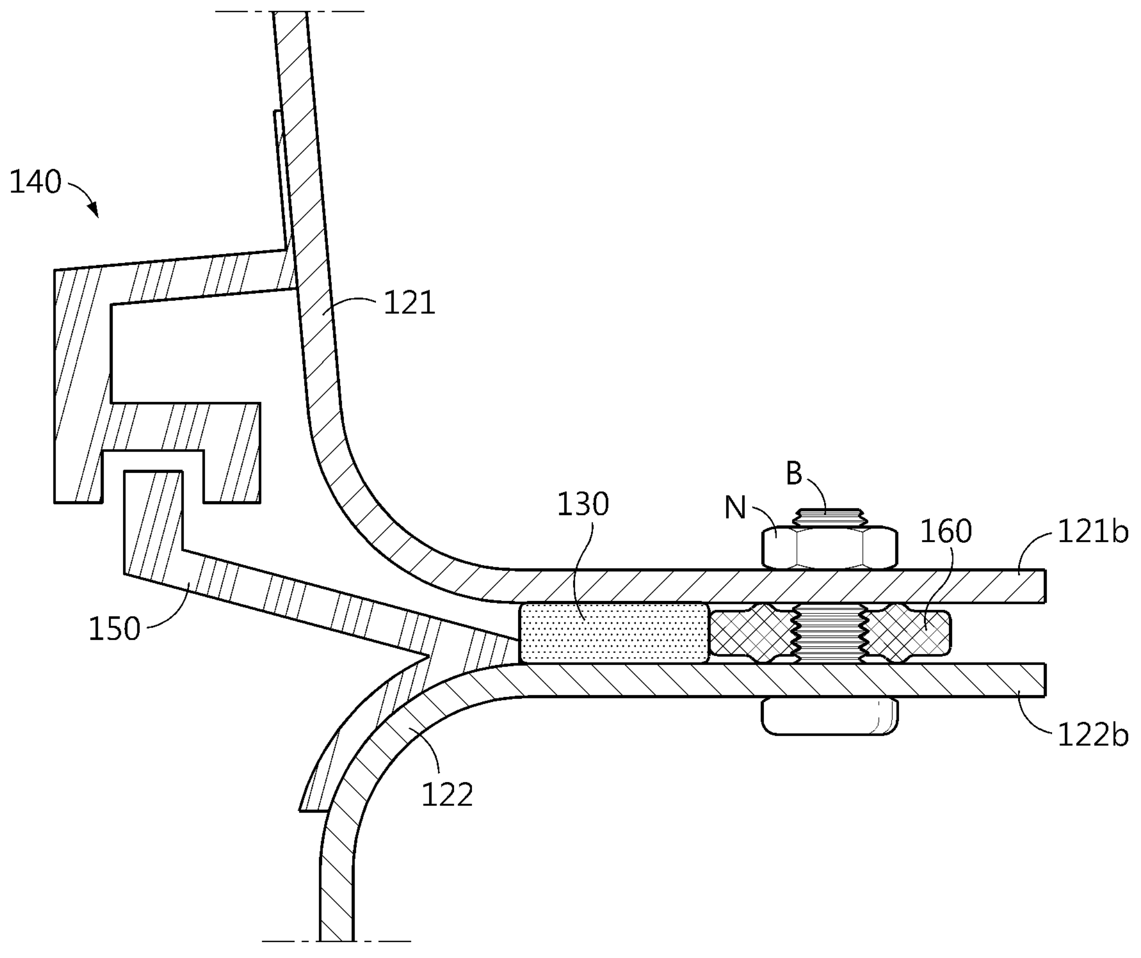
FIG. 8 is a partial vertical cross-sectional view schematically showing a portion of a battery pack according to another embodiment of the present disclosure.

FIG. 8 is a partial vertical cross-sectional view schematically showing a portion of a battery pack according to another embodiment of the present disclosure.

Referring to FIG. 8, the battery pack 100 according to another embodiment of the present disclosure may have a different position of the sealing member 130, unlike the battery pack 100 in FIG. 3. The other remaining configurations are the same as those of the battery pack 100 in FIG. 3.

Specifically, the sealing member 130 in FIG. 8 may be interposed between the first flange portion 121*b* and the second flange portion 122*b*. The sealing member 130 interposed between the first flange portion 121*b* and the second flange portion 122*b* may be configured to be melted at a predetermined temperature or higher to fill the gap between the first flange portion 121*b* and the second flange portion 122*b*. The sealing member 130 is melted at a predetermined temperature or higher, and then the molten sealing member 130 may be prevented from moving in the inner direction of the pack housing 120 by the guide member 150. That is, the guide member 150 may be configured such that a portion thereof supports the inner side of the sealing member 130 in an outward direction.

Therefore, according to this configuration of the present disclosure, since the present disclosure includes the sealing member 130 interposed between the first flange portion 121*b* and the second flange portion 122*b*, it is possible to effectively prevent the molten sealing member 130 from being lost to another place without being introduced between the first flange portion 121*b* and the second flange portion 122*b*. Accordingly, in the present disclosure, it is possible to prevent a malfunction in which the molten sealing member 130 is lost without being able to move in a direction between the first flange portion 121*b* and the second flange portion 122*b*, and thus the gap between the first flange portion 121*b* and the second flange portion 122*b* may not be sealed.

Meanwhile, the battery pack 100 according to an embodiment of the present disclosure may further include various devices (not shown) for controlling charge/discharge of the battery module 110, for example, a BMS module (Battery Management System Module, 190 in FIG. 2), a current sensor, a fuse, and the like.

Meanwhile, the energy storage system (not shown) according to an embodiment of the present disclosure includes at least one of the above-described battery packs 100. The energy storage system may further include a rack case (not shown) having an accommodation space for accommodating the plurality of battery packs 100.

In addition, the battery pack 100 according to an embodiment of the present disclosure may be included in a vehicle such as an electric vehicle or a hybrid vehicle. That is, the battery pack 100 according to the embodiment of the present disclosure described above may be mounted in the vehicle according to an embodiment of the present disclosure. In this case, the side cover 330 may be configured to be coupled to the vehicle body.

Meanwhile, the terms indicating directions as used herein such as upper, lower, left, right, front and rear are used for convenience of description only, and it is obvious to those skilled in the art that the term may change depending on the position of the stated element or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 100: battery pack | 110: battery module |
| 120: pack housing | 121, 122: first case, second case |
| 130: sealing member | 140: mounting member |
| 141, 142, 143, 144: upper portion, lower portion, extension portion, coupling portion | |
| S, Y: separated space, discharge space | |
| 150: guide member | 151: fixing portion |
| L: inclined surface | |
| H: guide groove | P: guide rib |
| 121a, 121b, 122a, 122b: first accommodation portion, first flange portion, second accommodation portion, second flange portion | |
| 160: gasket | B, N: bolt, nut |
| 190: BMS module | |

What is claimed is:

1. A battery pack, comprising:

a battery module comprising a plurality of battery cells;

a pack housing configured to accommodate the battery module therein, the pack housing comprising an inner surface, an outer surface and a joint extending between the inner surface and the outer surface, a first case configured to cover a first side of the battery module and having an open side, and a second case configured to cover a second side of the battery module and having an open side, the second case being coupled to the first case at the joint;

a sealing member located in the pack housing and inward of an inner surface of the pack housing, the sealing member being configured to melt at a predetermined temperature or higher to flow into a gap between the first case and the second case; and a mounting member located in the pack housing and above the joint, the mounting member being configured to retain the sealing member and having at least one open side so that the sealing member is discharged toward the joint.

2. The battery pack according to claim 1, wherein the mounting member has a guide groove to guide a discharge direction of the sealing member.

3. The battery pack according to claim 1, further comprising:

a guide member located in the pack housing, the guide member being configured to receive the sealing member and form a moving path through which the sealing member moves.

4. The battery pack according to claim 3, wherein the guide member has an inclined surface extending downwardly in a direction toward the joint.

5. The battery pack according to claim 3, wherein a guide rib is formed on the guide member to guide the sealing member to move in a direction toward the joint.

6. The battery pack according to claim 1, wherein the first case comprises a first accommodation portion accommodating the first side of the battery module, and a first flange portion extending horizontally from the first accommodation portion, wherein the second case comprises a second accommodation portion accommodating the second side of the battery module, and a second flange portion extending horizontally from the second accommodation portion and positioned to face the first flange portion, and wherein the sealing member is configured to flow between the first flange portion and the second flange portion.

7. The battery pack according to claim 6, wherein the pack housing comprises:

a gasket configured to be interposed between the first flange portion and the second flange portion; and a plurality of coupling members configured to couple the first flange portion and the second flange portion and spaced apart from each other by a predetermined distance, and wherein the sealing member is positioned between the plurality of coupling members.

8. A battery pack, comprising:

a battery module comprising a plurality of battery cells;

a pack housing configured to accommodate the battery module therein, the pack housing comprising a first case configured to cover a first side of the battery module and having an open side, and a second case configured to cover a second side of the battery module and having an open side, the second case having a flange coupled to a flange of the first case to form a joint;

a sealing member configured to melt at a predetermined temperature or higher to flow into a gap between the first case and the second case;

a guide member configured to support an inner side of the sealing member; and a gasket member located between the flange of the first case and the flange of the second case, wherein the sealing member is interposed between the flange of the first case and the flange of the second case and inwardly of the gasket member.

9. An energy storage system, comprising at least one battery pack according to claim 1.

10. A vehicle, comprising at least one battery pack according to claim 1.

11. The battery pack according to claim 1, further comprising:

a mounting member on an inner surface of the first case, the mounting member retaining the sealing member; and a guide member on an inner surface of the second case and under the mounting member, the guide member extending between the sealing member and the joint.

* * * * *